United States Patent [19]

Zirbel

[11] 4,275,460
[45] Jun. 23, 1981

[54] REAL-TIME AUDIO SPECTRUM ANALYZER
[75] Inventor: John P. Zirbel, Silver Spring, Md.
[73] Assignee: The United States of America as represented by the Secretary of the Navy, Washington, D.C.
[21] Appl. No.: 582,798
[22] Filed: Sep. 26, 1966
[51] Int. Cl.³ .............................................. G01S 15/32
[52] U.S. Cl. .................................... 367/102; 367/901
[58] Field of Search ........................... 340/3, 3 FM, 1; 367/102, 901

[56] References Cited

U.S. PATENT DOCUMENTS 2,724,817  11/1955  Hisserich ............................. 367/102
3,140,461  7/1964  McKinney ........................... 367/102

Primary Examiner—Richard A. Farley
Attorney, Agent, or Firm—R. S. Sciascia; A. L. Branning

[57] ABSTRACT

A propeller modulation enhancement and display system which suppresses hull echo and displays propeller modulation of a return sonar signal in real time. The real-time operation is obtained through the use of a multichannel frequency spectrum analyzer having a plurality of narrow bandpass filters covering the frequency of interest. Suppression of the hull echo is obtained through the use of a narrow band-reject filter having a variable center frequency. The filter precedes the multichannel frequency spectrum analyzer.

2 Claims, 3 Drawing Figures

REAL-TIME AUDIO SPECTRUM ANALYZER

The invention described herein may be manufactured and used by or for the Government of the United States of America for governmental purposes without the payment of any royalties thereon or therefor.

This invention relates generally to real-time audio spectrum analyzers, and more particularly to a propeller modulation enhancement and display system which processes and displays propeller modulation of a return sonar signal in real time.

In the presence of a continuous-transmission, frequency-modulated sonar signal, the echo from a submarine propeller blade is modulated by virtue of the propeller's rotation. This effect is termed "propeller modulation". The presence of propeller modulation is positive evidence of a submarine contact. The action of the propeller on the transmitted sonar signal is such as to return an echo that is both displaced in frequency from the submarine hull echo and amplitude modulated at a rate equal to the shaft rotation times the number of blades on the propeller.

One present day approach to analyze continuous transmission, frequency-modulated sonar signals for propeller modulation information is to employ an instrument that records a sample of data on a magnetic disc and then analyzes it by scanning the frequency spectrum with a 45 hertz bandwidth filter. The resultant portrayal on a sheet of recording paper displays frequency along the vertical axis, time along the horizontal axis, and signal strength by darkness of the pattern. The analysis of each sample takes several minutes to perform, not including the time required to locate and re-record the desired portion from the original tape. When many hours of recorded data are to be analyzed, this technique is an exceedingly time consuming undertaking.

It is therefore an object of this invention to provide a propeller modulation enhancement and display system which processes and displays the propeller modulation in realtime.

One of the problems encountered in attempting to provide such a system is that the hull echo is generally stronger than the propeller modulation information. When this is the case, and if the display device utilized has a limited dynamic range, then a strong hull echo will tend to mask the propeller modulation signal.

It is therefore another object of this invention to provide a circuit that allows for suppression of the hull echo and simultaneously not affect the propeller modulation echo.

According to the present invention, the foregoing and other objects are attained by a system which provides a signal portrayal in the form of a frequency versus time display on a long-persistance CRT where the intensity of the pattern indicates the relative strengths of the signal components. The real-time operation feature is obtained through the use of a multichannel frequency spectrum analyzer having a plurality of narrow bandpass filters covering the frequency spectrum of interest. Suppression of the hull echo is obtained with a narrow band-reject filter having a variable center frequency which precedes the multichannel frequency spectrum analyzer.

The specific nature of the invention, as well as other objects, aspects, uses and advantages thereof, will clearly appear from the following description and from the accompanying drawing, in which.

Figure 1:
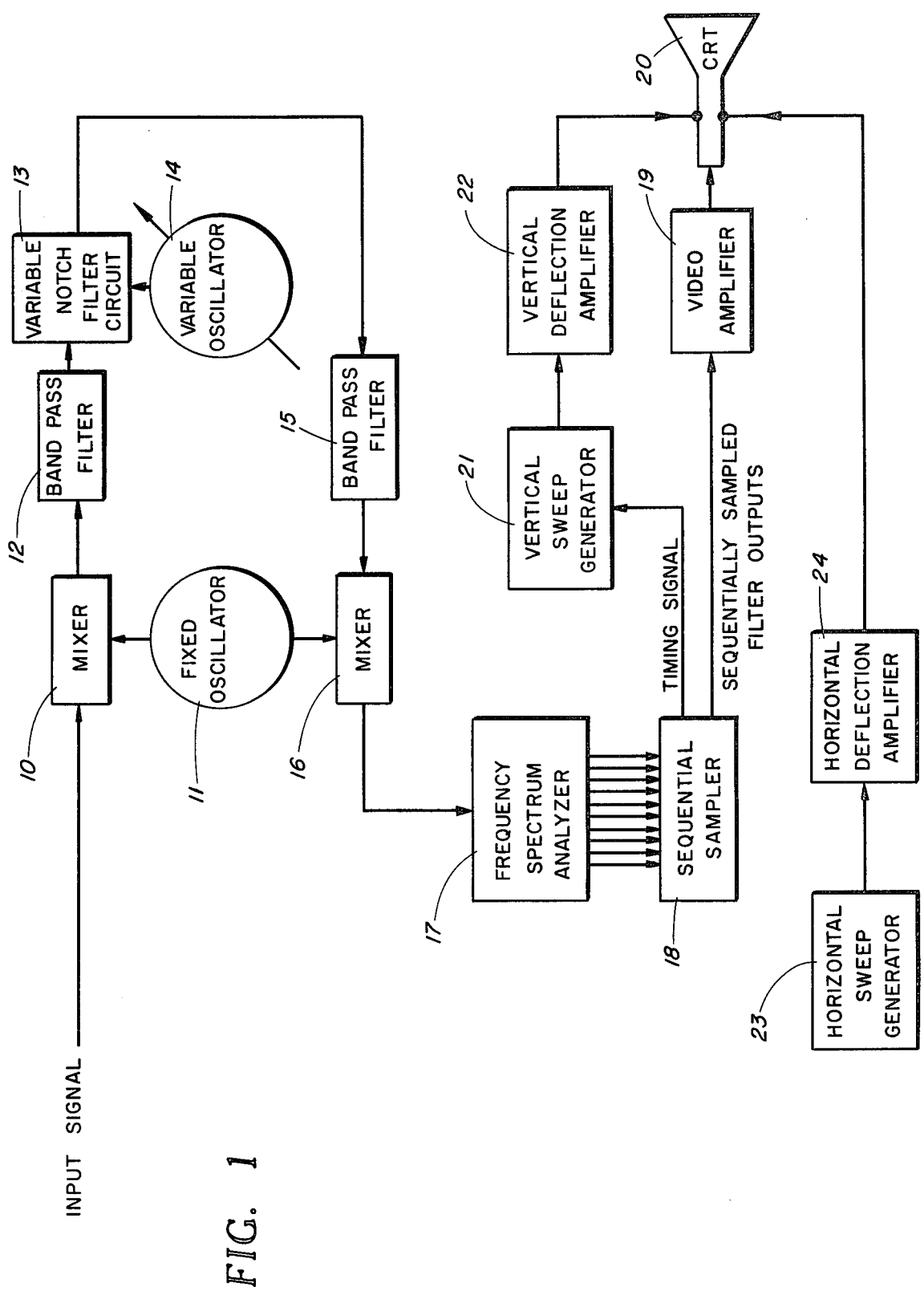
FIG. 1 is a block diagram of the real-time propeller modulation enhancement and display system according to the invention.

Referring now to the drawing, and more particularly to FIG. 1, the input signal from a continuous-transmission, frequency-modulated sonar is applied to the input of mixer 10. The input signal which is the difference frequencies between the return echo signal from a target and the transmitted signal would typically include the hull echo signal, propeller modulation information and noise. A fixed frequency oscillator 11 provides a reference frequency signal to mixer 10 which beats this signal with the input signal to heterodyne the input signal to a higher frequency band which is better suited to the operation of the circuitry that follows. The heterodyned output signal from mixer 10 is applied to the input of bandpass filter 12 which eliminates noise outside the frequency spectrum of interest. The thus filtered signal is then applied to the input of a variable notch filter circuit 13 the center frequency of which is variable and is controlled by a variable frequency oscillator 14. A suitable circuit for this purpose is disclosed in co-pending application Ser. No. 536,947, filed Mar. 18, 1966, by George W. Meeker, Jr., now U.S. Pat. No. 3,353,147, and commonly assigned herewith. The purpose of the variable notch filter circuit 13 is to eliminate the hull echo signal thereby enhancing the propeller modulation information. To understand how this is accomplished, it is necessary to understand the basic principle of operation of a continuous-transmission, frequency-modulated sonar system. In such a system the transmitted energy is linearly varied within a predetermined frequency band over a short period of time. The frequency difference between the transmitted wave and the one received is then a measure of the travel time to a target and back, and hence its range. For a constant range, a constant difference frequency results, providing the operator with continuous target information. In operation then, the variable notch filter 13 is centered on the hull echo frequency by adjustment of variable frequency oscillator 14. The propeller modulation information is not effected since, as mentioned earlier, the propeller modulation echo is displaced in frequency from the hull echo. The output of variable notch filter circuit 13 is passed through a bandpass filter 15 to a mixer 16. Bandpass filter 15 rejects any noise outside the frequency band of interest which may have been introduced by variable notch filter circuit 13. Like mixer 10, mixer 16 receives a reference frequency signal from fixed frequency oscillator 11 and heterodynes the signal from bandpass filter 15 to the original frequency band of the input signal from the continuous-transmission, frequency-modulated sonar system.

After passage through the propeller modulation enhancement circuitry, the processed beat frequency signals are fed to a conventional multichannel frequency spectrum analyzer 17. Frequency spectrum analyzer 17 permits the real-time operation and includes a plurality of narrow bandpass filters each tuned to a different center frequency within the frequency spectrum to be analyzed. An envelope detector follows each filter to provide a rectified output. The outputs of each of the envelope detectors are sequentially sampled by a sequential sampler 18 which may be, for example, a ring oscillator controlled gating circuit of conventional design. The sampled output from sequential sampler 18 may be applied to the input of a video amplifier 19 which controls the electron beam intensity of a CRT 20 having a long persistance screen. Sequential sampler 18 also provides a synchronizing timing signal to a vertical sweep generator 21 which establishes the frequency axis. The output of vertical sweep generator 21 may be amplified by a vertical deflection amplifier 22 and applied to the vertical deflection plates of CRT 20. The time axis is generated through the use of a free-running horizontal sweep. This is provided by a horizontal sweep generator 23 the output of which may be fed to a horizontal deflection amplifier 24 and applied to the horizontal deflection plates of CRT 20.

Figure 2:
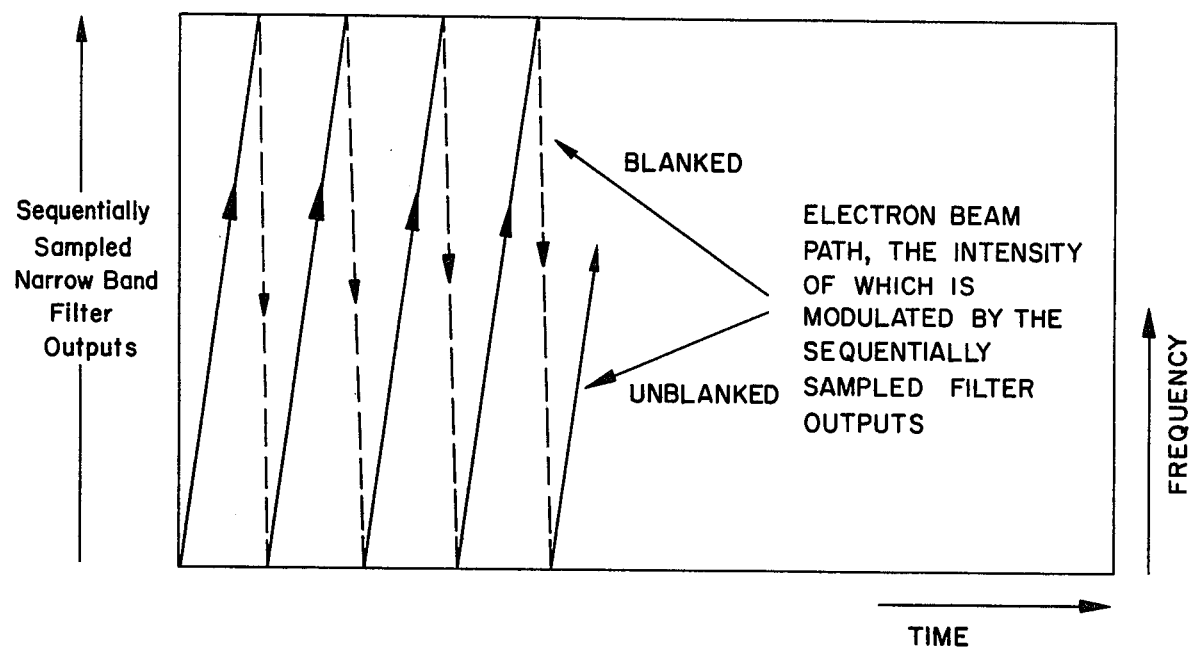
FIG. 2 illustrates the frequency versus time display.
Figure 3:
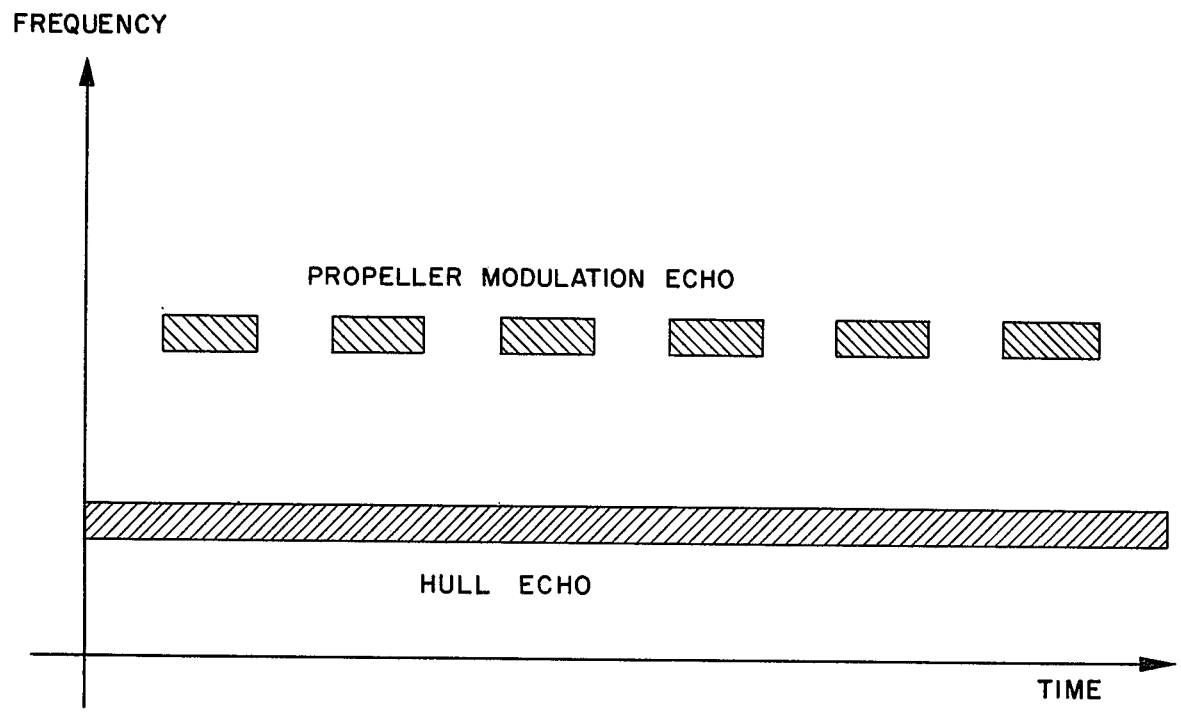
FIG. 3 illustrates a representative propeller modulation display.

The resulting frequency versus time display on the CRT is illustrated in FIG. 2. For purposes of illustration, the horizontal spacing between vertical sweeps is exaggerated. The period of the horizontal sweep is adjusted for the best display of propeller modulation information commensurate with the rate of information flow. FIG. 3 shows a propeller modulation display that has been observed using the invention. For comparison, the hull echo is also illustrated.

Obviously, many modifications and variations of the present invention are possible in the light of the above teachings. It is therefore to be understood that within the scope of the appended claims, the invention may be practiced otherwise than as specifically described.

Having thus described the invention, what is claimed is:

1. In a continuous-transmission, frequency-modulated sonar system, a propeller modulation enhancement and display system which processes and displays propeller modulation of a return sonar signal including a hull echo signal in real-time, comprising:

a multichannel frequency spectrum analyzer covering the frequency spectrum of interest, means for sequentially sampling the individual outputs of said frequency spectrum analyzer, a long persistance CRT having the intensity of its electron beam modulated by the output of said sequentially sampling means thereby providing a visual indication of the relative strengths of the signal components in said return sonar signal, means synchronized with said sequentially sampling means for vertically sweeping the electron beam of said CRT and thereby establishing the frequency axis of the resultant CRT display, means for horizontally sweeping the electron beam at said CRT and thereby establishing the time axis of the resultant CRT display, and means preceding said multichannel frequency spectrum analyzer for suppressing the hull echo in said return sonar signal.

2. A propeller modulation enhancement and display system as recited in claim 1 wherein said means for suppressing the hull echo comprises a narrow bandreject filter having a variable center frequency.

* * * * *